(12) United States Patent
Arai

(10) Patent No.: US 9,057,332 B2
(45) Date of Patent: Jun. 16, 2015

(54) START CONTROL SYSTEM AND VEHICLE

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 249 days.

(21) Appl. No.: 13/996,647

(22) PCT Filed: Oct. 7, 2011

(86) PCT No.: PCT/JP2011/073180
§ 371 (c)(1),
(2), (4) Date: Jun. 21, 2013

(87) PCT Pub. No.: WO2012/086296
PCT Pub. Date: Jun. 28, 2012

(65) Prior Publication Data
US 2013/0289856 A1 Oct. 31, 2013

(30) Foreign Application Priority Data

Dec. 24, 2010 (JP) ................. 2010-288575

(51) Int. Cl.
*F02D 11/10* (2006.01)
*B60W 30/188* (2012.01)
*F02D 29/02* (2006.01)
(Continued)

(52) U.S. Cl.
CPC ......... *F02D 11/105* (2013.01); *B60W 30/1882*
(2013.01); *B60W 2300/36* (2013.01); *B60W 2510/0638* (2013.01); *B60W 2710/0644* (2013.01); *B60Y 2200/12* (2013.01); *F02B 61/02* (2013.01); *F02D 29/02* (2013.01); *F02D 41/0205*
(2013.01); *F02D 41/10* (2013.01); *F02D 2200/602* (2013.01); *F02D 28/00* (2013.01)

(58) Field of Classification Search
CPC ............. F02D 11/105; F02D 41/0205; B60W 30/1882
USPC ............... 701/113, 110, 102, 101; 123/179.3, 123/179.1, 319; 477/116
See application file for complete search history.

(56) References Cited

U.S. PATENT DOCUMENTS 4,874,070 A * 10/1989 Nellums et al. ................. 477/84
5,575,737 A * 11/1996 Weiss .............................. 477/43
(Continued)

FOREIGN PATENT DOCUMENTS

EP 1437255 A2 7/2004
JP 61-38229 U 3/1986
JP 09-207628 A 8/1997
(Continued)

OTHER PUBLICATIONS

Official Communication issued in International Patent Application No. PCT/JP2011/073180, mailed on Nov. 15, 2011.

*Primary Examiner* — Mahmoud Gimie
(74) *Attorney, Agent, or Firm* — Keating & Bennett, LLP

(57) ABSTRACT

A start control system stores a map M1 that associates an accelerator position with an initial target speed of an engine and a map M2 that associates an accelerator position with a final target speed of the engine. If it is determined that a vehicle is in a start control period, a target speed of the engine is set to the initial target speed. When the engine speed reaches the initial target speed, the engine target speed is set to the final target speed. The initial target speed is set to a larger value than the final target speed for the same accelerator position.

12 Claims, 12 Drawing Sheets

(51) Int. Cl.
*F02D 41/02* (2006.01)
*F02D 41/10* (2006.01)
*F02D 28/00* (2006.01)
*F02B 61/02* (2006.01)

(56) References Cited

U.S. PATENT DOCUMENTS

| | | | |
|---|---|---|---|
| 6,063,003 | A | 5/2000 | Kubota et al. |
| 6,530,861 | B1 * | 3/2003 | Nakashima ................ 477/85 |
| 2008/0254942 | A1 | 10/2008 | Minami |
| 2010/0057313 | A1 | 3/2010 | Arai |

| | | | |
|---|---|---|---|
| 2010/0063695 | A1 | 3/2010 | Sakaue |

FOREIGN PATENT DOCUMENTS

| | | |
|---|---|---|
| JP | 11-311320 A | 11/1999 |
| JP | 2000-120468 A | 4/2000 |
| JP | 2004-218671 A | 8/2004 |
| JP | 2007-298018 A | 11/2007 |
| JP | 2008-157184 A | 7/2008 |
| JP | 2008-168720 A | 7/2008 |
| JP | 2008-232421 A | 10/2008 |
| JP | 2010-059802 A | 3/2010 |
| JP | 2010-60079 A | 3/2010 |

* cited by examiner

START CONTROL SYSTEM AND VEHICLE

BACKGROUND OF THE INVENTION

1. Field of the Invention

The present invention relates to a technique of automatically controlling a clutch provided in a vehicle.

2. Description of the Related Art

A vehicle provided with a transmission device can perform shift changes by changing a transmission gear ratio in the transmission device. In order to perform a shift change, a clutch provided upstream of the transmission device must be disengaged so that torque from the engine is not transmitted to the transmission device.

One type of transmission device is a manual transmission device in which the operation of engaging and disengaging the clutch is manually controlled by a driver. Another type of transmission device is an automatic transmission device in which the operation of engaging and disengaging the clutch is controlled automatically.

A person driving a vehicle provided with a manual transmission device adjusts an engine speed, a vehicle acceleration, and time until the clutch engages by operating the accelerator and clutch at the time of starting the vehicle. The driver attempts to start the vehicle as he/she intends by operating the accelerator and the clutch. In other words, the driver might feel uncomfortable about abrupt acceleration and stressful about too slow acceleration. The driver performs the accelerator operation and the clutch operation so that acceleration is as smooth as possible and in a comfortable manner.

As for a vehicle provided with an automatic transmission device, it is desirable that traveling proceeds as intended by a driver at the time of starting the vehicle.

JP 61-38229 U discloses a technique using an automatic clutch device. The disclosed automatic clutch device is adapted to select among preset different clutch control patterns in response to a change ratio for an accelerator position. More specifically, a control pattern for a sudden start and climbing start is selected if the accelerator position corresponds to a prescribed value or more, and a control pattern for a normal start is selected if the position corresponds to a value less than the prescribed value so that the clutch control based on the control patterns is performed.

JP 2008-232421 A discloses a clutch controller. The clutch controller is controlled such that, if the engine is operated in a predetermined driving range, torque transmitted to the downstream side through the clutch is approximated to the engine torque.

SUMMARY OF THE INVENTION

A start control system according to a preferred embodiment of the present invention includes a determining unit that determines a vehicle state, an input unit that inputs an accelerator position, a target speed setting unit that sets an engine target speed, and a storing unit that stores setting information. The storing unit stores first association information that associates an accelerator position with a first target speed of an engine and second association information that associates an accelerator position with a second target speed of the engine. The target speed setting unit sets the engine target speed to the first target speed if it is determined by the determining unit that the vehicle is in a start control period. The target speed setting unit sets the engine target speed to the second target speed when a value used to evaluate the engine speed reaches the first target speed. The first target speed is set to a larger value than the second target speed for the same accelerator position.

In an initial state of starting, a rider can feel sufficient torque. It does not take too long before the clutch engages, and therefore starting as intended by the rider can be carried out.

Preferred embodiments of the present invention provide a technique of optimally controlling torque that is to be transmitted to downstream of a clutch so that a start as intended by a rider can be carried out.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A vehicle including an automatic start control system according to preferred embodiments of the present invention will be described in conjunction with the accompanying drawings. In the following, a motorcycle will be described as an example of the vehicle including the automatic start control system according to the preferred embodiments. However, the automatic start control system according to the preferred embodiments is applicable to a vehicle other than the motorcycle, such as an automobile, for example.

Figure 1:
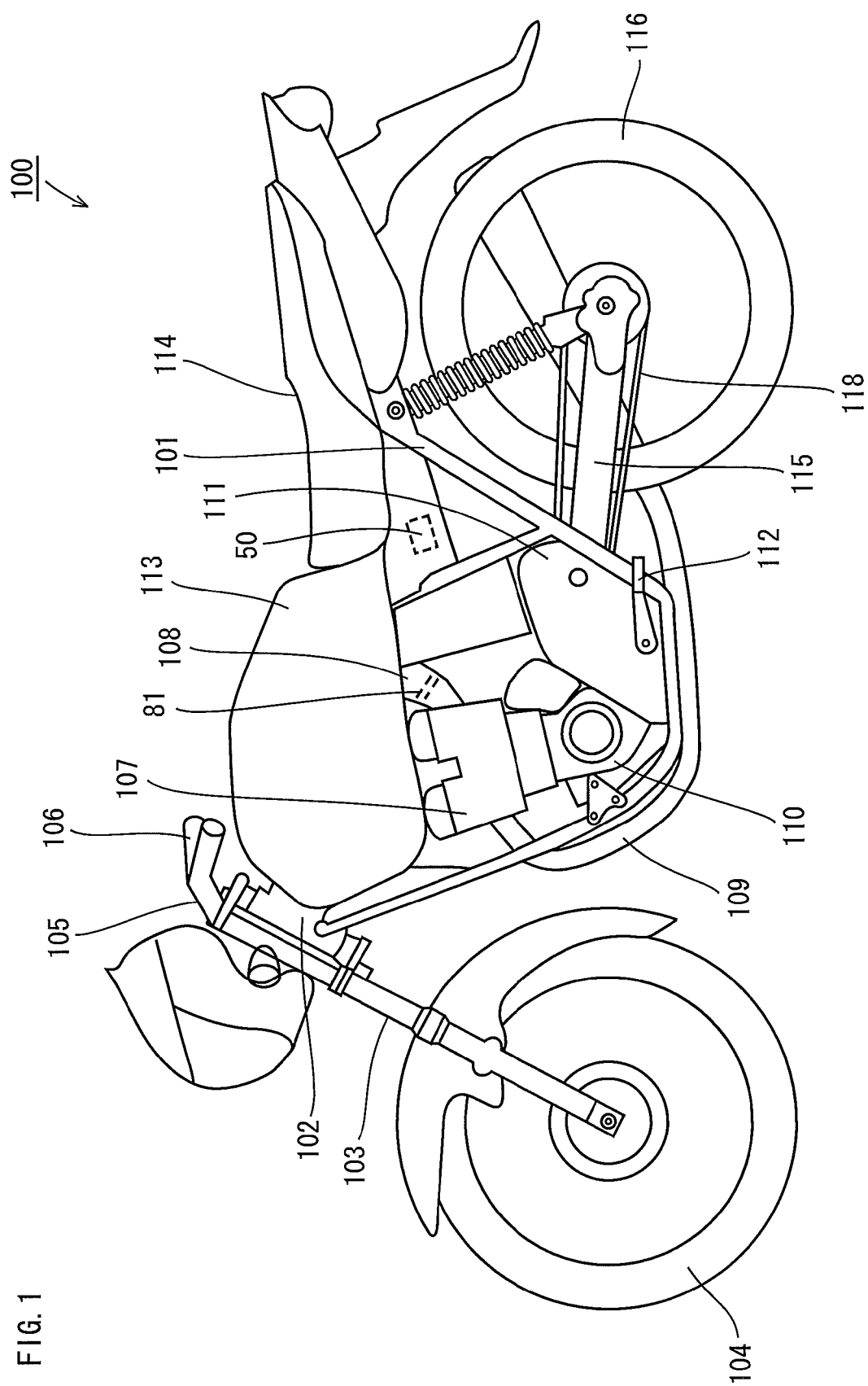
FIG. 1 is a side view of a motorcycle including an automatic start control system according to a preferred embodiment of the present invention.

FIG. 1 is a side view of a motorcycle according to a preferred embodiment of the present invention. The motorcycle 100 includes a main body frame 101. A head pipe 102 is provided at a front end of the main body frame 101. A pair of front forks 103 is provided at the left and right sides of the head pipe 102. A front wheel 104 is supported rotatably at lower ends of the front forks 103. A handle 105 is supported at an upper end of the head pipe 102.

The handle 105 is provided with an accelerator grip 106. The main body frame 101 is provided with a four-cylinder engine 107, for example. A throttle body 108 is attached to an intake port of the engine 107. An exhaust pipe 109 is attached to an exhaust port of the engine 107. The throttle body 108 is provided with an electronically controlled throttle valve 81. The amount of air supplied to the four cylinders of the engine 107 is regulated by adjusting the position of the throttle valve 81 (hereinafter referred to as the throttle position).

A crankcase 110 is provided under the engine 107. A crank 2 for the engine 107 is stored in the crankcase 110.

A transmission case 111 is provided behind the crankcase 110. A transmission device 5 and a shift device 6 are provided in the transmission case 111. A shift pedal 112 is provided at a side of the transmission case 111.

According to the present preferred embodiment, the operation of disengaging a clutch 3 by a rider is not necessary when the gear position of the transmission device 5 is switched. The motorcycle 100 is provided with a semi-automatic transmission control system adapted to automatically switch between gear positions of the transmission device 5 in response to a shift operation by the rider. The clutch 3 according to the present preferred embodiment is preferably a wet-type multi-disk clutch, for example.

A fuel tank 113 is provided above the engine 107. A seat 114 is provided behind the fuel tank 113. A controller 50 is provided under the seat 114.

The main body frame 101 is attached to a rear arm 115 capable of swinging in an up-down direction. A rear wheel 116 is supported rotatably at a rear end of the rear arm 115. A chain 118 is attached between the transmission case 111 and the rear wheel 116.

Figure 2:
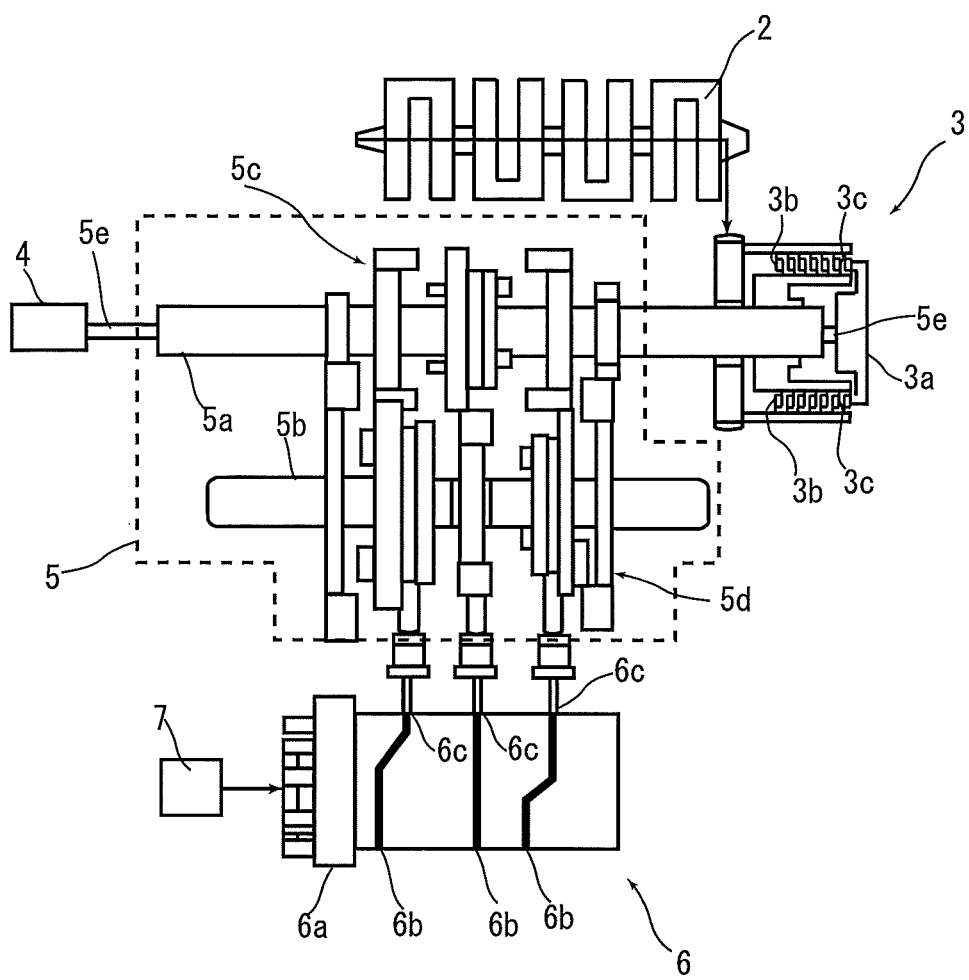
FIG. 2 shows a transmission device and a shift device.

The transmission device 5 and the shift device 6 stored in the transmission case 111 will now be described. FIG. 2 shows the transmission device 5 and the shift device 6.

As shown in FIG. 2, the transmission device 5 includes a main shaft 5a and a drive shaft 5b. A multiple-step shift gear 5c is mounted to the main shaft 5a and a multi-step shift gear 5d is mounted to the drive shaft 5b. The shift gears 5c and 5d define, for example, a gear group that can shift among five steps.

The main shaft 5a is coupled to the crank 2 of the engine 107 through the clutch 3. The clutch 3 includes a pressure plate 3a, a plurality of clutch disks 3b, and a plurality of friction disks 3c. The clutch disks 3b are rotated by torque transmitted from the crank 2. The friction disks 3c are coupled to the main shaft 5a and rotate together with the main shaft 5a.

The friction disks 3c are energized by the pressure plate 3a in such a direction that the disks 3c are closely contacted to the clutch disks 3b. In the following, a state in which the plurality of clutch disks 3b and the plurality of friction disks 3c are closely contacted with one another will be referred to as an engaged state of the clutch 3 and a state in which they are spaced apart from one another will be referred to as a disengaged state of the clutch 3. When the clutch 3 is in the engaged state, the torque of the crank 2 is transmitted to the main shaft 5a through the clutch disks 3b and the friction disks 3c, while in the disengaged state of the clutch 3, the torque of the crank 2 is not transmitted to the main shaft 5a.

A push rod 5e is inserted in the main shaft 5a. One end of the push rod 5e is coupled to the pressure plate 3a and the other end is coupled to an electric or hydraulic clutch actuator 4.

According to the present preferred embodiment, when the clutch actuator 4 is driven by control of the controller 50, the push rod 5e is pushed out toward the clutch 3. In this manner, the pressure plate 3a is pushed so that the clutch disks 3b and the friction disks 3c are spaced apart from one another. As a result, the clutch 3 attains a disengaged state.

When the clutch 3 is in an engaged state, torque transmitted from crank 2 to the main shaft 5a is transmitted to the drive shaft 5b through the shift gears 5c and 5d. The drive shaft 5b is attached with the chain 118 shown in FIG. 1. The torque of the drive shaft 5b is transmitted to the rear wheel 116 through the chain 118.

The reduction ratio between the main shaft 5a and the drive shaft 5b is determined based on the combination of the shift gears 5c and 5d. The shift gears 5c and 5d are moved by a shift mechanism 6.

The shift mechanism 6 includes a shift cam 6a. The shift cam 6a includes a plurality of cam grooves 6b (for example, three in FIG. 2). The cam grooves 6b are each mounted with a shift fork 6c. The shift cam 6a is connected to an electric or hydraulic shift actuator 7 through a link mechanism that is not shown.

According to the present preferred embodiment, when the shift actuator 7 is driven in response to control by the controller 50, the shift cam 6a is rotated. In this manner, the shift forks 6c move along the cam grooves 6b. As a result, one of the shift gears 5c and 5d moves so that the gear position of the transmission device 5 is changed.

Figure 3:
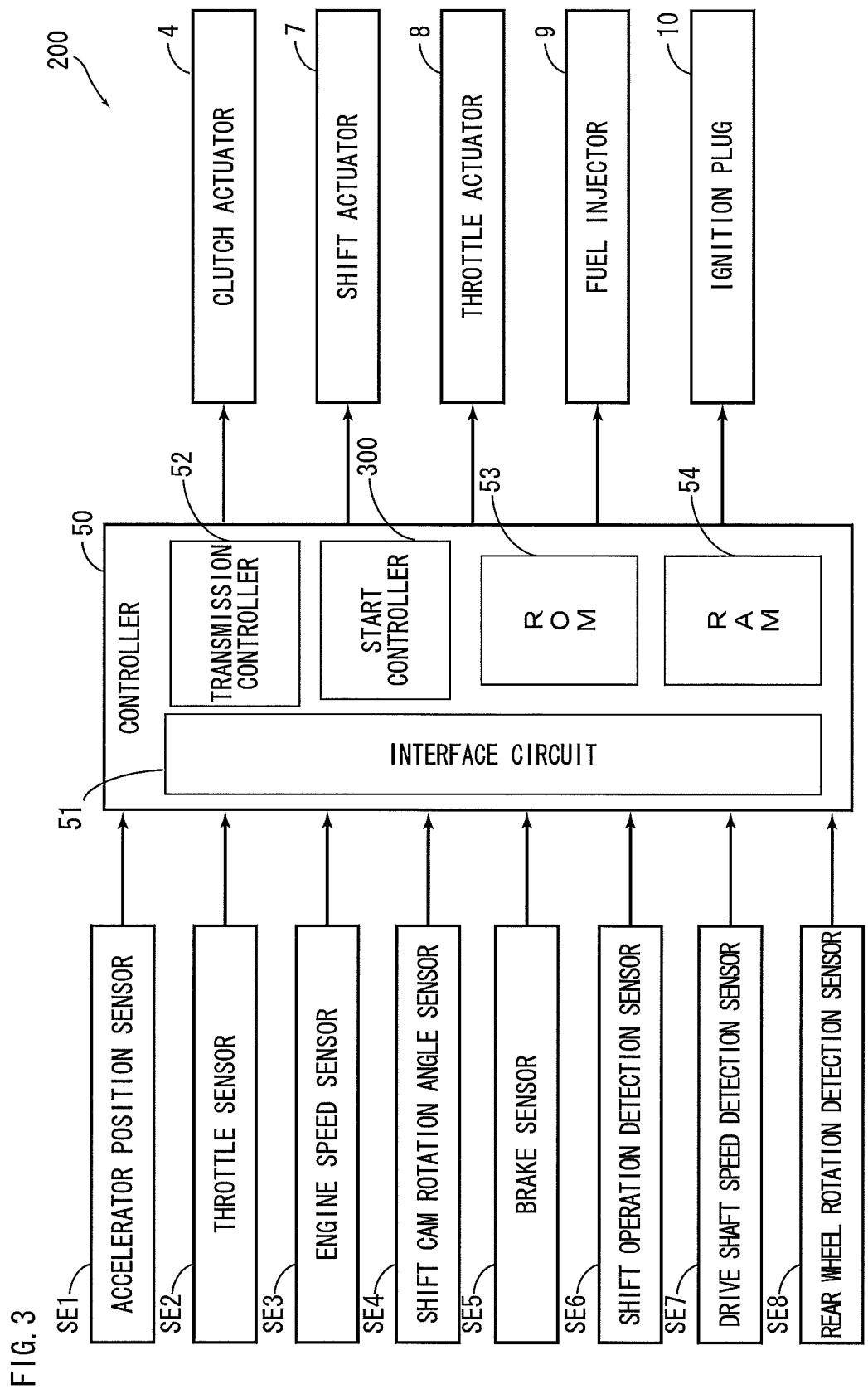
FIG. 3 is a block diagram of a control system including the automatic start control system.

A transmission control system 200 in the motorcycle 100 will now be described. FIG. 3 is a block diagram of the transmission control system 200 according to the present preferred embodiment. The automatic start control system according to the present preferred embodiment defines a portion of the transmission control system 200.

The transmission control system 200 includes a transmission controller 52 and various sensors and actuators shown in FIG. 3. The automatic start control system includes a start controller 300 and various sensors and actuators as shown in FIG. 3. The transmission controller 52 is a functional unit implemented when a program stored in a ROM 53 runs on a CPU while using a RAM 54 as a working area. The start controller 300 includes a hardware circuit according to the present preferred embodiment. The start controller 300 however may be defined by a CPU and a program operating on the CPU, for example.

As shown in FIG. 3, the transmission control system 200 includes an accelerator position sensor SE1, a throttle sensor SE2, an engine speed sensor SE3, a shift cam rotation angle sensor SE4, a brake sensor SE5, a shift operation detection sensor SE6, a drive shaft speed detection sensor SE7, a rear wheel rotation detection sensor SE8, the controller 50, the clutch actuator 4, the shift actuator 7, a throttle actuator 8, a plurality of fuel injectors 9, and a plurality of ignition plugs 10.

The accelerator position sensor SE1 detects an operation amount of the accelerator grip 106 (hereinafter referred to as the "accelerator position") by a rider and applies the detected accelerator position to the controller 50.

The throttle sensor SE2 detects a throttle position and applies the detected throttle position to the controller 50.

The engine speed sensor SE3 detects a speed of the engine 107 and applies the detected speed to the controller 50. According to the present preferred embodiment, the engine speed sensor SE3 detects an angular velocity of the crank 2 to detect the engine speed of the engine 107.

The shift cam rotation angle sensor SE4 detects a rotation angle of the shift cam 6a and applies the detected rotation angle to the controller 50.

The brake sensor SE5 detects an amount of the brake lever (not shown) and/or the brake pedal (not shown) operated by a rider and applies the detected operation amount to the controller 50.

The shift operation detection sensor SE6 detects a direction of the shift pedal 112 operated by a rider and applies a signal indicating the detected operation direction (a signal indicating shift up or shift down) to the controller 50. The shift operation detection sensor SE6 includes, for example, a potentiometer, a load sensor, or a magneto-strictive sensor.

The drive shaft speed detection sensor SE7 detects a rotation speed of the drive shaft 5*b* and supplies the detected rotation speed to the controller 50.

The rear wheel rotation detection sensor SE8 detects a rotation speed of the rear wheel 116 and supplies the detected rotation speed to the controller 50.

The controller 50 includes an interface circuit 51, the transmission controller (central processing unit) 52, the ROM (Read Only Memory) 53, the RAM (Random, Access Memory) 54, and the start controller 300.

The output signals from the sensors SE1 to SE8 are applied to the transmission controller 52 or the start controller 300 through the interface circuit 51. The transmission controller 52 controls the output of the engine 107 based on the results of detection from the sensors SE1 to SE8. The start controller 300 carries out a start control of the vehicle based on the detection results from the sensors SE1 to SE8. The ROM 53 stores programs that operate the transmission controller 52 and various kinds of setting values. The RAM 54 stores various kinds of data and also serves as a working area for the transmission controller 52.

The shift actuator 7 is, for example, an electric or hydraulic type device and is controlled by the transmission controller 52 to rotate the shift cam 6*a*.

The throttle actuator 8 includes, for example, an electric motor and is controlled by the transmission controller 52 to adjust the position of the throttle valve 81.

The fuel injectors 9 are provided corresponding to the cylinders of the engine 107. According to the present preferred embodiment, four fuel injectors 9 are provided corresponding to the four cylinders of the engine 107, for example.

The ignition plugs 10 are provided corresponding to the cylinders of the engine 107. According to the present preferred embodiment, four ignition plugs 10 are provided corresponding to the four cylinders of the engine 107, for example.

When the motorcycle 100 travels, the transmission controller 52 controls the throttle actuator 8 in response to an accelerator position detected by the accelerator position sensor SE1. In this manner, the throttle position is adjusted and the output of the engine 107 is controlled. The relationship between the accelerator position and the throttle position is previously stored in the ROM 53 (or RAM 54) of the controller 50.

The transmission controller 52 carries out feedback control of the throttle actuator 8 in response to the throttle position detected by the throttle sensor SE2. In this manner, the throttle position can be adjusted appropriately.

When a rider performs a shift operation, the transmission controller 52 disengages the clutch 3 by controlling the clutch actuator 4. The transmission controller 52 controls the throttle actuator 8 to adjust the throttle position so that the engine speed of the engine 107 is increased or decreased to an appropriate engine speed for the shift change.

The transmission controller 52 then controls the shift actuator 7 to rotate the shift cam 6*a*. This moves the shift fork 6*c* and thus the shift gear 5*c* or 5*d*. As a result, the gear position of the transmission device 5 is changed. Then, the transmission controller 52 controls the clutch actuator 4 to engage the clutch 3. In this manner, the shift change of the transmission device 5 ends.

The automatic start control system according to the present preferred embodiment sets two kinds of engine target speeds during start control operation. More specifically, when a start operation is performed while the transmission device 5 is set to the first gear position, an initial target speed and a final target speed are set before the clutch is engaged.

Figure 4:
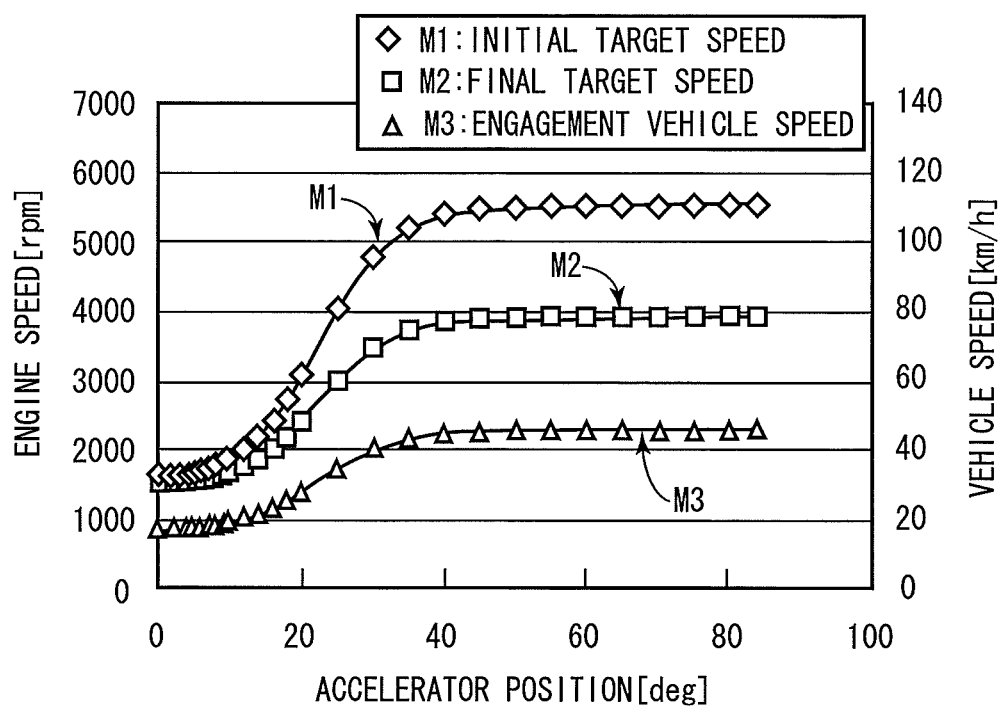
FIG. 4 is a map showing a relationship between an accelerator position and an engine speed.

FIG. 4 shows the initial target speed (graph M1) and the final target speed (graph M2). In FIG. 4, the abscissa represents the accelerator position (deg) and the ordinate (the vertical axis on the left side of the graph) represents the engine speed (rmp). In FIG. 4, the unit of the accelerator position (deg) is angle) (°).

As shown, a larger value than the final target speed is set as the initial target speed. The initial target speed is a target speed set in an initial stage of start control. The final target speed is a target speed set in a latter portion of the start control. When the vehicle starts, an initial target speed is set as an engine target speed. The engine target speed is calculated successively moment by moment in a calculation cycle toward the initial target speed. Then, when the calculated engine target speed reaches the initial target speed, a final target speed is set as an engine target speed. The relationship between the value of the accelerator position, the initial target speed, and the final target speed is stored as map information in the ROM 53 or RAM 54.

In FIG. 4, an engagement vehicle speed (graph M3) is also plotted. In FIG. 4, when the engagement speed is referred to, the right ordinate of the graph is referred to. The engagement vehicle speed is a vehicle speed when the clutch 3 attains a complete engaged state and there is no difference in speed between the upstream side and the downstream side of the clutch 3.

As shown in FIG. 4, the initial target speed is set to a larger value than the final target speed. In this manner, in an early stage of starting, sufficient torque can be obtained so that a rider does not feel stress. When the final target speed is set to a large value like the initial target speed, it takes a long time to engage the clutch. Therefore, the final target speed is set to a value smaller than the initial target speed so that it does not take a long time before the clutch engages and a highly responsive start can be achieved.

Figure 5:
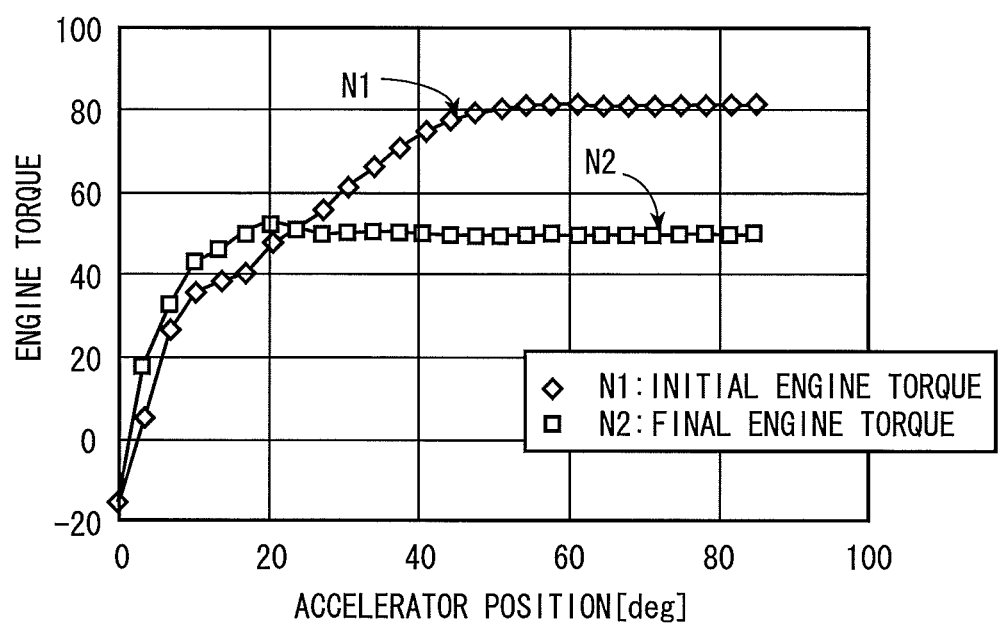
FIG. 5 is a map showing a relationship between an accelerator position and engine torque.

FIG. 5 shows the relationship between an accelerator position, initial engine torque (graph N1), and final engine torque (graph N2). The initial engine torque corresponds to a change in the engine torque when the engine speed of the engine 107 is controlled based on the initial target speed shown in FIG. 4. The final engine torque corresponds to a change in the engine torque when the speed of the engine 107 is controlled based on the final target speed shown in FIG. 4.

Figure 6:
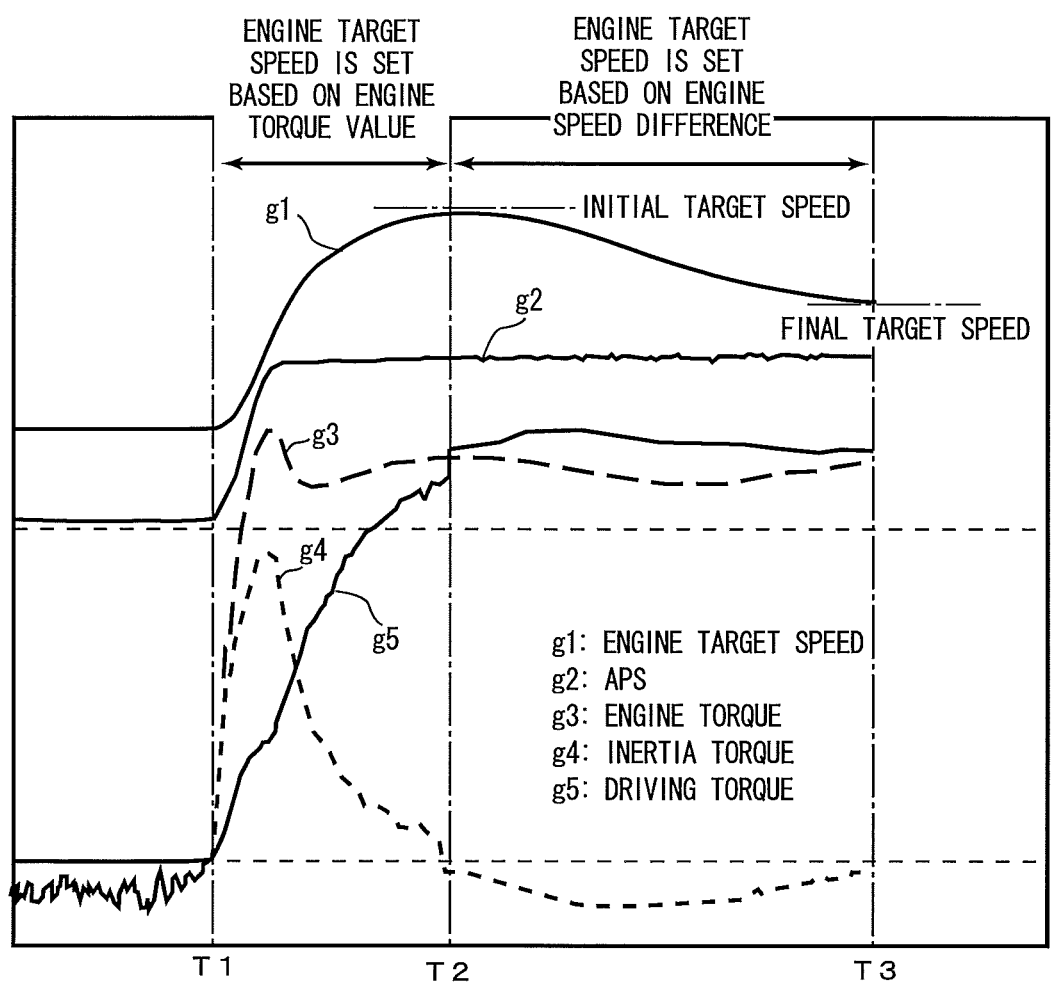
FIG. 6 shows state change during automatic start control.

FIG. 6 shows various state changes during start control. More specifically, various changes occur when start control is performed according to the two engine target speeds shown in FIGS. 4 and 5. The abscissa in FIG. 6 represents time. FIG. 6 includes changes in the engine target speed (graph g1), the accelerator position (graph g2), the engine torque (graph g3), inertia torque (graph g4), and driving torque (graph g5) during the start control.

In FIG. 6, timing T1 is a starting point for the start operation. Timing T2 is a time when the engine target speed calculated in a calculation cycle reaches the initial target speed. Timing T3 is a time when the engine target speed calculated in the calculation cycle reaches the final target speed. As for the engine target speeds as shown, the T1-T2 period corresponds to the initial target speed and the T2-T3 period corresponds to the final target speed.

In timing T1, a rider operates the accelerator grip 106 to start an accelerator operation. As shown, the accelerator position increases immediately after timing T1 in response to the accelerator operation by the rider. In the example as shown, the rider thereafter maintains the accelerator position virtually at a fixed value.

The start controller 300 uses the map shown in FIG. 4 and sets an engine target speed in response to the accelerator position. In the T1-T2 period, an initial target speed is set and the speed increases so that a relatively large acceleration can be achieved. After the initial target speed is attained in timing T2, a final target speed is set as an engine target speed. Therefore, the engine target speed is gradually reduced to reach the final target speed in timing T3.

Immediately after timing T1, the engine speed increases according to the initial target speed, and therefore the engine torque abruptly increases as shown. As can be seen from the map for the initial target speed in FIG. 4, the engine speed increases most greatly immediately after timing T1. Therefore, immediately after timing T1, the inertia torque reaches a peak value as shown. Therefore, the driving torque obtained by subtracting the inertia torque from the engine torque is small immediately after timing T1 so that smooth start can be achieved. In this manner, a distribution ratio of the inertia torque is set according an achievement ratio with respect to the initial target speed so that a change in the engine speed reaches its largest value immediately after the start, and therefore a comfortable start with reduced shock can be achieved.

From timing T1 toward T2, the inertia torque value is reduced. In this manner, the inclination of the engine target speed becomes smaller. When the engine target speed switches from the initial target speed to the final target speed, the inertia torque value is close to zero, and a change in the engine speed is the smallest. In the vicinity of timing T2, the driving torque is close to the engine torque so that sufficient torque is transmitted to the drive shaft 5b.

After timing T2, the initial target speed is switched to the final target speed, and therefore the engine speed starts to be lowered. In this manner, the inertia torque attains a negative value. In timing T3 when the engine speed reaches the final target speed, the inertia torque once again attains a value close to zero.

According to the present preferred embodiment, the sign of the inertia torque as the engine speed increases is defined as positive and the sign of the inertia torque as the engine speed decreases is defined as negative. The relationship among engine torque, Teg, engine inertia, Je, a derivative of an engine angular speed, dw/dt, and clutch torque, Tcl is represented as Teg−Je*dwe/dt=Tcl. In other words, according to the graph in FIG. 6, the relationship represented by g3-g4=g5 holds.

In this manner, the start control according to the present preferred embodiment allows the driving torque to be increased approximately linearly before an engine target speed calculated in a calculation cycle reaches an initial target speed. As will be detailed below, when the achieving ratio of the engine speed with respect to the initial target speed is low, the inertia torque distribution ratio is set high so that the engine speed can be increased quickly. Furthermore, a change in the engine speed is smaller in the period in which the achieving ratio of the engine speed with respect to the final target speed is low and higher than in the period with an intermediate achieving ratio. In this manner, a change in the engine speed is reduced in a time period in which the initial target speed is switched from the initial target speed to the final target speed or in a time period in which the clutch engages so that a smooth change in states change can be achieved.

Figure 7:
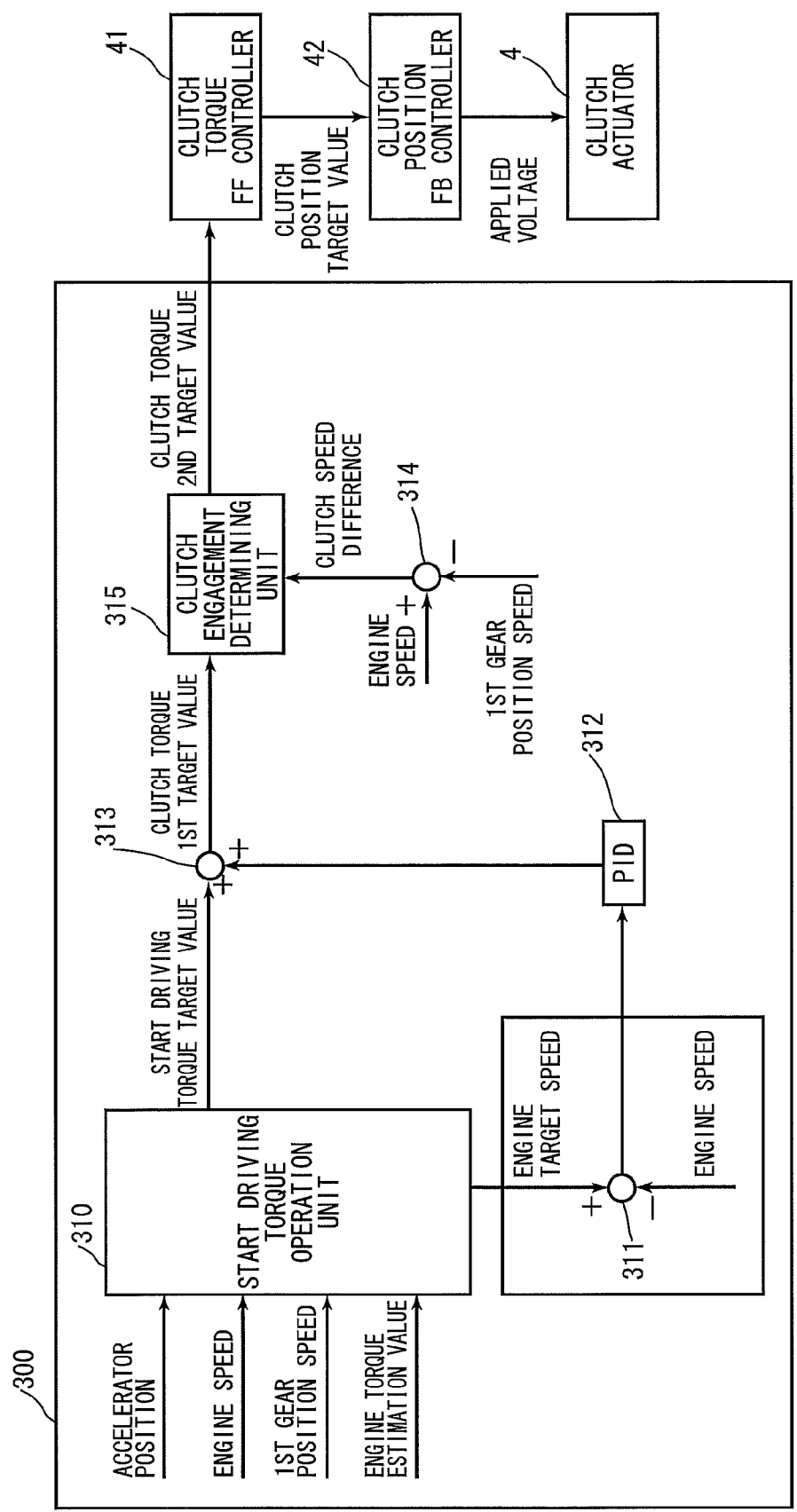
FIG. 7 is a block diagram of a start controller.
Figure 8:
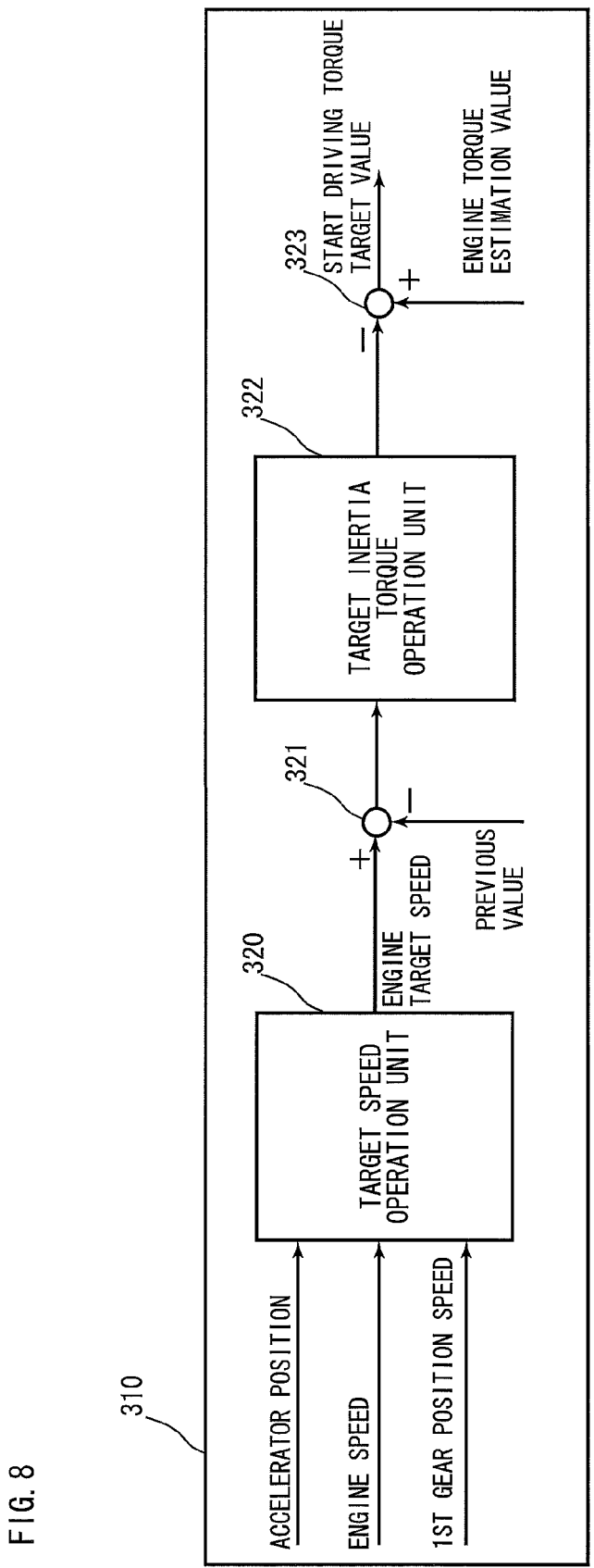
FIG. 8 is a block diagram of a driving torque operation unit.
Figure 9:
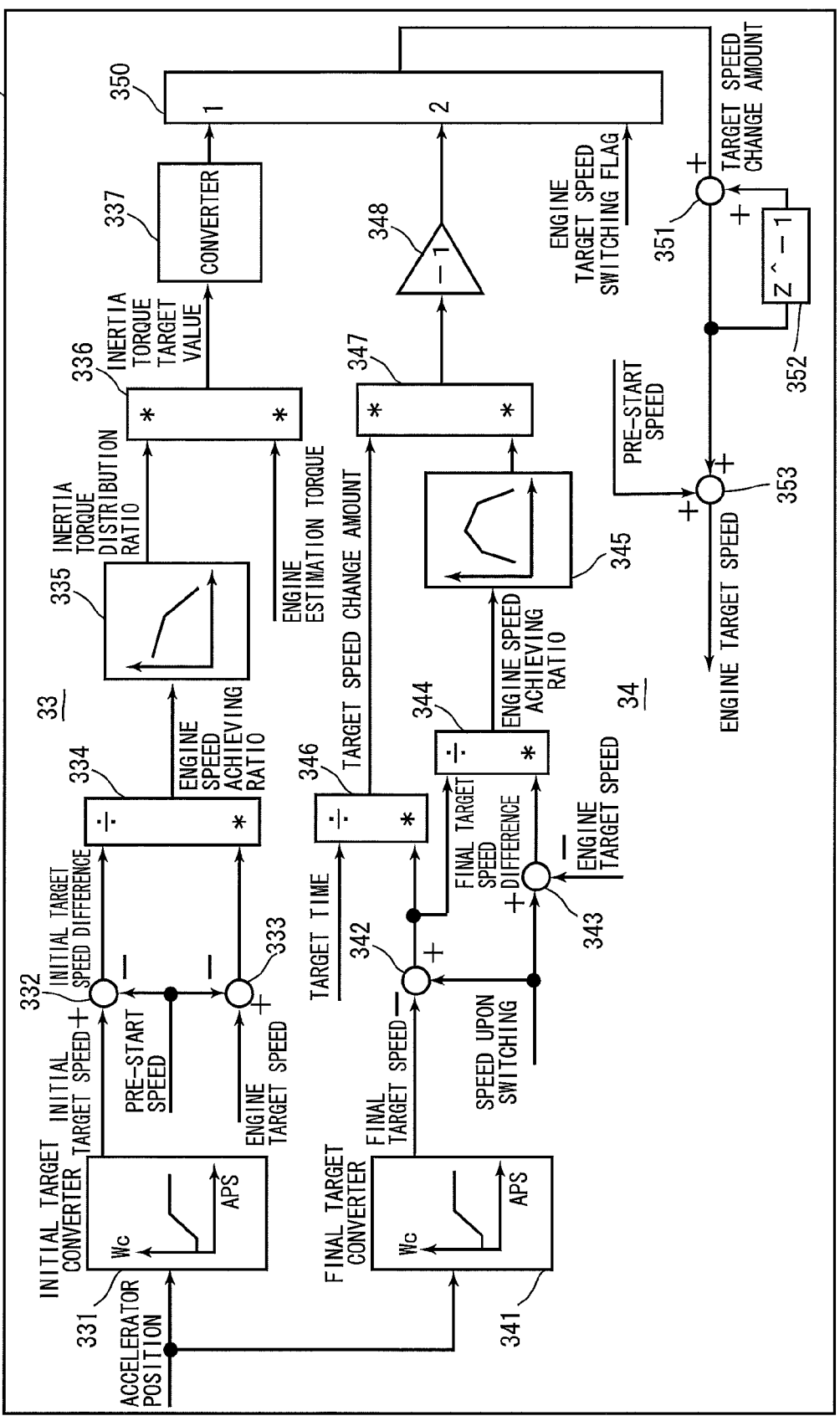
FIG. 9 is a block diagram of a target speed operation unit.

Referring to FIGS. 7 to 9, the structure and operation of the start control system will now be described. FIG. 7 is a block diagram of the start controller 300. FIG. 8 is a block diagram of a start driving torque operation unit 310. FIG. 9 is a block diagram of a target speed operation unit 320.

As shown in FIG. 7, the start controller 300 includes the start driving torque operation unit 310, a subtracter 311, a PID controller 312, an adder 313, a subtracter 314, and a clutch engagement determining unit 315.

The start driving torque operation unit 310 receives an accelerator position as an input from the accelerator position sensor SE1. The start driving torque operation unit 310 receives an engine speed as an input from the engine speed sensor SE3. The start driving torque operation unit 310 receives a first gear position speed from the driving shaft speed sensor SE7 as an input. The start driving torque operation unit 310 also receives an engine torque estimation value as an input. The engine torque estimation value is calculated by the controller 50. The controller 50 calculates the engine torque estimation value based on the outputs of the engine speed sensor SE3 and the throttle sensor SE2.

FIG. 8 is a block diagram of the start driving torque operation unit 310. As shown in FIG. 8, the start driving torque operation unit 310 includes the target speed operation unit 320, a subtracter 321, a target inertia torque operation unit 322, and a subtracter 323.

The target speed operation unit 320 receives an accelerator position, an engine speed, and a first gear position speed as inputs.

FIG. 9 is a block diagram of the target speed operation unit 320. The target speed operation unit 320 includes a first operation unit 33 that carries out operations related to an initial target speed and a second operation unit 34 that carries out operations related to a final target speed.

The first operation unit 33 will now be described. The first operation unit 33 includes an initial target converting unit 331, a torque distribution unit 335, and a converter 337.

The initial target converter 331 receives an accelerator position as an input. The initial target converter 331 converts the accelerator position into an initial target speed according to a map M1 shown in FIG. 4.

The subtracter 332 subtracts a pre-start speed from the initial target speed and calculates an initial target speed difference. The pre-start speed is an engine speed obtained when start control is initiated (i.e., at time T1 in FIG. 6). The start controller 300 stores the pre-start speed in RAM 54.

The subtracter 333 subtracts the pre-start speed from the calculated present engine target speed. The present engine target speed is an engine target speed output in a calculation cycle and an output of the target speed operation unit 320. An actual engine speed fluctuates from various causes, and therefore the present engine target speed is used as a value to evaluate the present engine speed according to the present preferred embodiment.

A divider 334 divides the output of the subtracter 333 by the initial target speed difference as the output of the subtracter 332 to obtain an engine speed achieving ratio. More specifically, the initial target speed determined by referring to the map M1 in FIG. 4 and the present engine target speed are compared to obtain an achieving ratio relative to the pre-start state as a reference.

Then, the torque distribution unit 335 converts the engine speed achieving ratio into an inertia torque distribution ratio. A map used to convert the engine speed achieving ratio into the inertia torque distribution ratio is recorded in the ROM 53 or RAM 54.

A multiplier 336 multiplies engine estimation torque by the inertia torque distribution ratio to produce an inertia torque target value.

In this manner, the target speed operation unit 320 determines the inertia torque distribution ratio based on the engine speed achieving ratio. The torque output from the engine 107 is distributed for inertia torque according to the determined inertia torque distribution ratio. A map used to determine the inertia torque is set so that the inertia torque distribution ratio increases as the engine achieving ratio is lower and it decreases as the engine speed achieving ratio is higher. In this manner, in an early stage of starting, the inertia torque is large and the driving torque does not abruptly increase, which enables smooth starting. Around the initial target speed, the inertia torque distribution ratio is reduced. In this manner, when the speed is closer to the initial target speed, sufficient driving torque is obtained and a rider can have a stress-free acceleration feeling.

The converter 337 converts the inertia torque target value into an engine speed change amount. Inertia torque is generated in response to a change ratio in the engine speed. Therefore, the converter 337 calculates a change amount in the engine speed reversely from an inertia torque target value. The change amount in the engine speed can be viewed locally as a change ratio in the engine speed.

The second operation unit 34 will now be described. The second operation unit 34 includes a final target converter 341 and a speed change distribution unit 345.

The final target converter 341 receives an accelerator position as an input. The final target converter 341 converts the accelerator position into a final target speed according to the map M2 shown in FIG. 4.

The subtracter 342 subtracts the final target speed from a speed upon switching to produce a final target speed difference. The speed upon switching is an engine target speed calculated when the initial target speed is switched to the final target speed (i.e., in timing T2 in FIG. 6). The start controller 300 stores the speed upon switching in the RAM 54.

The subtracter 343 subtracts the present engine target speed from the speed upon switching. The present engine target speed is an engine target speed output in a calculation cycle and an output of the target speed operation unit 320. An actual engine speed fluctuates from various causes, and therefore the present engine target speed is used as a value to evaluate the present engine speed according to the present preferred embodiment.

The divider 344 divides the output of the subtracter 343 by a final target speed difference as the output of the subtracter 342 to produce an engine speed achieving ratio. The final target speed determined by referring to the map M2 in FIG. 4 and the present engine target speed are compared to obtain an achieving ratio with respect to a state upon switching as a reference.

Now, the speed change distribution unit 345 converts the engine speed achieving ratio into a speed change distribution ratio. A map used to convert the engine speed achieving ratio into a speed change distribution ratio is stored in the ROM 53 or RAM 54.

According to the present preferred embodiment, the map used to convert the engine speed achieving ratio into a distribution ratio of speed changes is set so that change amounts in the starting period and the ending period are smaller than a change amount in between. More specifically, the T2-T3 period shown in FIG. 6 is divided into a first period starting immediately after T2, a second period following the first period, and a third period following the second period. Then, the speed change amount distribution is determined so that a speed change amount in the second period is larger than those in the first period with the smallest speed achieving ratio and in the third period with the largest speed achieving ratio among the three periods.

The divider 346 divides the final target speed difference as the output of the subtracter 342 by target time to produce a target speed change amount. The target time is a time after an initial target speed is attained until a final target speed is attained and stored in the ROM 53 or RAM 54. For example, if about ⅔ of the period between timing T1 and timing T3 is allocated to the T2-T3 period, start control as intended by a rider can be carried out.

A multiplier 347 multiplies a target speed change amount by a speed change distribution ratio to produce a present target speed change amount. An inverting unit 348 inverts the sign of the target speed change amount. More specifically, the engine speed decreases toward the final target speed so that the target speed change amount is denoted with a minus sign.

A selector 350 receives outputs from the converter 337 and the inverting unit 348 as inputs. The selector 350 also receives an engine target speed flag as an input. The engine target speed flag is set to "1" until an initial target speed is attained and to "2" until a final target speed is attained after the initial target speed is attained.

The selector 350 outputs an output of the converter 337 to an adder 351 when the flag "1" is input. The selector 350 outputs an output of the inverting unit 348 to the adder 351 when the flag "2" is input.

The adder 351 adds a previous target speed change amount stored in a buffer 352 to the output of the selector 350. The change amount in the target speed added up at the adder 351 is output to an adder 353. The pre-start engine speed is added to the target speed change amount added up at the adder 353. In this manner, the adder 351 outputs an engine target speed.

Referring back to FIG. 8, an engine target speed output from the target speed operation unit 320 is input to the subtracter 321. The subtracter 321 subtracts the previous engine target speed from the engine target speed to produce a target speed change amount.

The target inertia torque operation unit 322 obtains an inertia torque target value based on the target speed change amount. The subtracter 323 subtracts the inertia torque target value from the engine estimation torque to produce a start driving torque target value.

Referring back to FIG. 7, the start driving torque operation unit 310 outputs a start driving torque target value. The start driving torque target value is input to the adder 313.

The start driving torque operation unit 310 outputs an engine target speed. The engine target speed is an output of the target speed operation unit 320. The engine target speed is input to the subtracter 311.

The subtracter 311 subtracts the present engine speed from the engine target speed and outputs a speed difference to the PID controller 312. The PID controller 312 carries out feedback control of the speed difference and outputs a torque adjustment value to the adder 313. The adder 313 adds the torque adjustment value to the start driving torque target value to output a clutch torque first target value.

The subtracter 314 subtracts the first gear position speed from the engine speed and outputs a clutch speed difference. The clutch engagement determining unit 315 receives the clutch speed difference as an input and determines whether the clutch 3 can be engaged or not. The state in which the clutch 3 can be engaged indicates the state in which the speed difference between the clutch disks 3b and the friction disks 3c of the clutch 3 is not more than a prescribed value.

When the clutch 3 is not in an engageable state, the clutch engagement determining unit 315 maintains the start control.

More specifically, the clutch torque first target value is directly output as a clutch torque second target value.

When the clutch 3 is in an engageable state, the clutch engagement determining unit 315 sets a completion value as a clutch torque second target value in order to complete the start control. The completion value is a clutch torque value previously set to complete engagement of the clutch 3. Control based on the completion value completes the engagement state of the clutch 3, in other words, the clutch attains an engaged state.

A clutch torque FF (feed forward) controller 41 outputs a clutch position target value in response to the clutch torque second target value. More specifically, a map representing the relationship between the clutch torque and the clutch position is stored in the ROM 53 or RAM 54. The clutch torque FF controller 41 converts the clutch torque second target value into a clutch position for output by referring to the map.

The clutch position FB (feedback) controller 42 receives the clutch position target value as an input and determines voltage used to move the clutch to the clutch position target value. The determined voltage is output to the clutch actuator 4 so that the clutch 3 is controlled by the clutch actuator 4.

The flow of the process by the above start controller 300 will be described in conjunction with flow charts in FIGS. 10 to 13.

Figure 10:
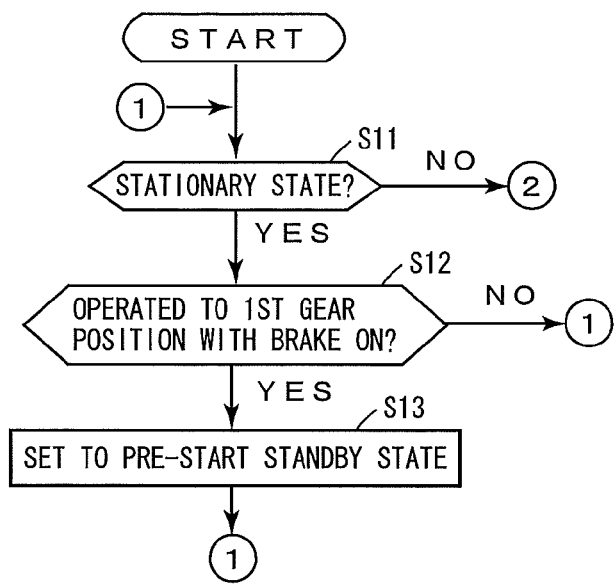
FIG. 10 is a flow chart for showing the content of an automatic start control process.

Referring to FIG. 10, the start controller 300 determines whether a vehicle is in a stationary state (step S11). The start controller 300 detects the number of rotations of the rear wheel based on an output of the rear wheel rotation detection sensor SE8 and determines whether the vehicle is in a stationary state.

Then, the start controller 300 determines whether a shift operation to the first gear position has been made while the brake is on (step S12). The start controller 300 makes a determination in step S12 based on detection values from the brake sensor SE5 and the shift operation detection sensor SE6.

If it is determined that the shift operation to the first gear position has been made while the brake is on, the start controller 300 sets the state status to a "pre-start standby state." The state status is stored in the RAM 54.

Figure 11:
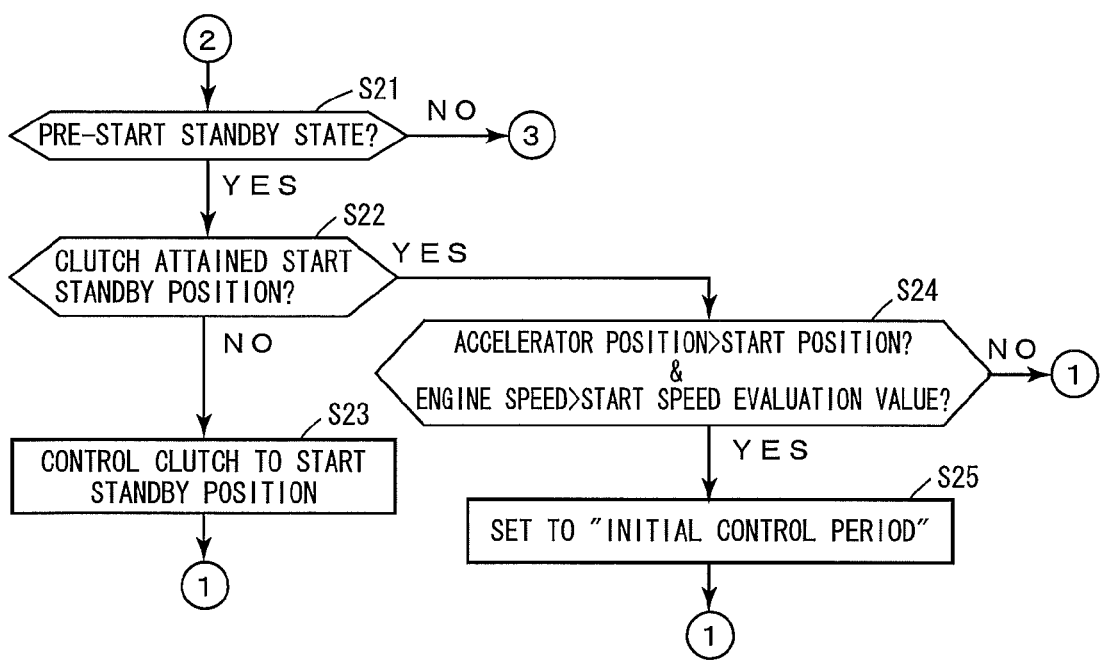
FIG. 11 is a flow chart for showing the content of the automatic start control process.

If it is determined that the vehicle is not in a stationary state, the control proceeds to step S21 in FIG. 11. In step S21, the start controller 300 refers to the state status and determines whether the vehicle is in a "pre-start standby state" (step S21).

If it is determined that the vehicle is in the "pre-start standby state," it is determined whether the clutch 3 has reached a start stand-by position (step S22). If the clutch 3 has not reached the start stand-by position, the control proceeds to step S23. In step S23, the start controller 300 carries out a control to move the clutch 3 to the start standby position.

In step S22, if the clutch 3 has reached the start stand-by position, determination in step S24 is carried out. It is determined in step S24 whether the accelerator position is greater than the start position. It is further determined in step S24 whether the engine speed is greater than the start speed. If the conditions are both satisfied, the control proceeds to step S25 and the start controller 300 sets the state status to an "initial control period." Note that the start position and the start speed are stored in the ROM 53 or RAM 54. The "initial control period" is a period in which control is carried out according to the initial target speed as described above and corresponds to the T1-T2 period in FIG. 6.

Figure 12:
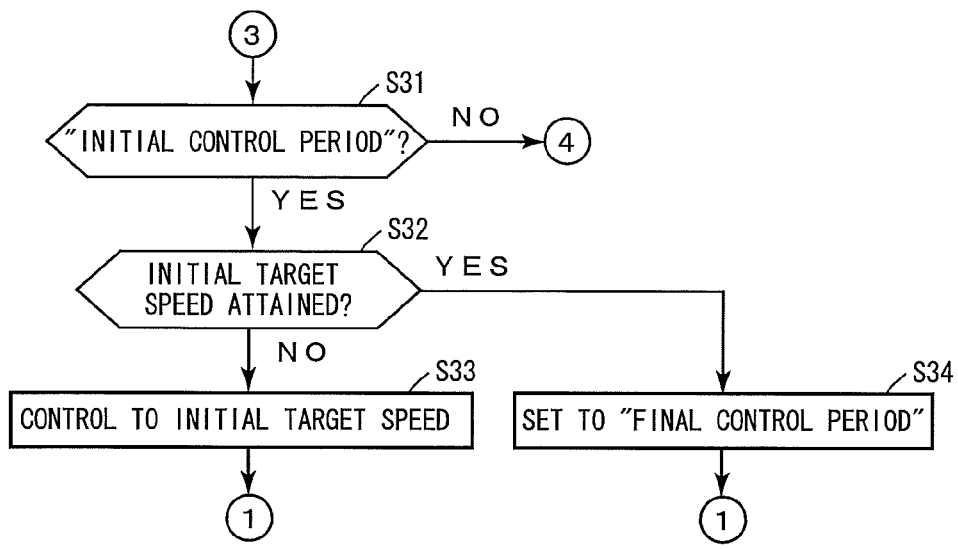
FIG. 12 is a flow chart for showing the content of the automatic start control process.

If it is determined in step S21 that the vehicle is not in the "pre-start standby state," the control proceeds to step S31 in FIG. 12. It is determined in step S31 whether the state status is the "initial control period."

If it is determined that the state status is the "initial control period," the start controller 300 determines whether the present engine target speed calculated has reached the initial target speed (step S32). If the engine target speed has not reached the initial target speed, the control proceeds to step S33. In step S33, the start controller 300 performs such a control that the engine speed reaches the initial target speed.

If it is determined in step S32 that the present engine target speed calculated has reached the initial target speed, the start controller 300 sets the state status to the "final control period" (step S34).

Figure 13:
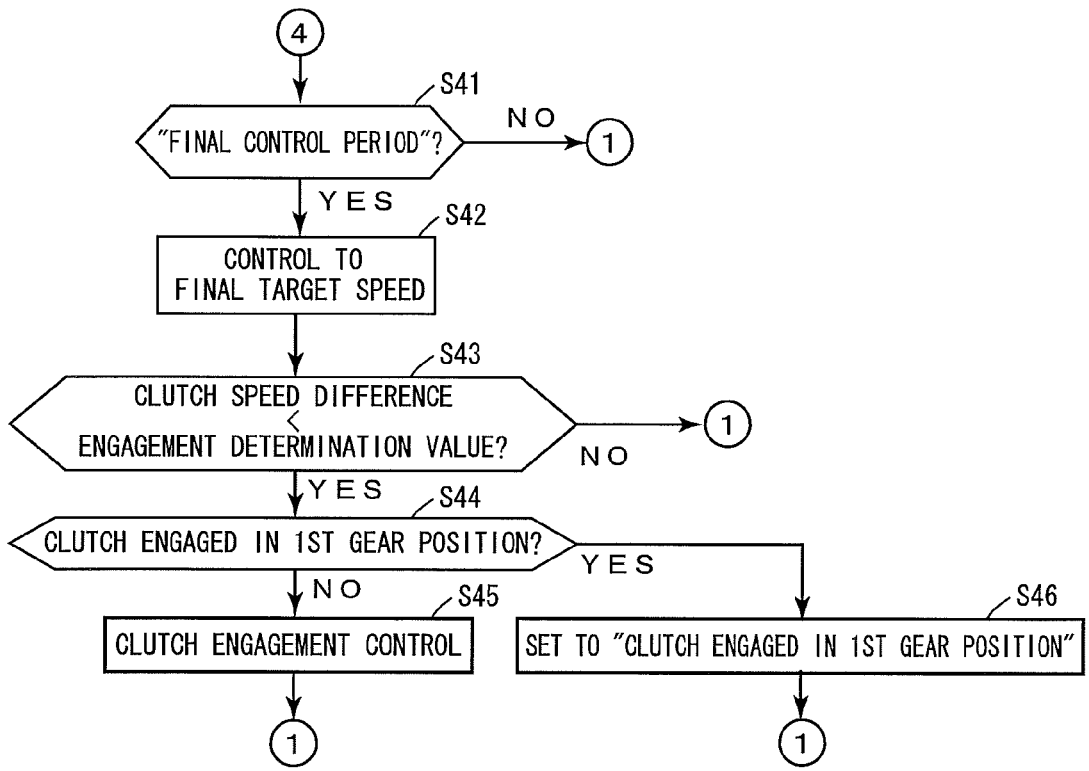
FIG. 13 is a flow chart for showing the content of the automatic start control process.

If it is determined in step S31 that the status is not the "initial control period," the control proceeds to step S41 in FIG. 13. In step S41, the start controller 300 determines whether the state status is the "final control period." In step S42, the start controller 300 carries out such a control that the engine speed reaches the final target speed.

In step S43, the start controller 300 determines whether the clutch speed difference is less than an engagement determination value (step S43). The engagement determination value is stored in the RAM 54. The engagement determination value is a threshold for the clutch speed difference. The determination is carried out by the clutch engagement determining unit 315 shown in FIG. 7.

If it is determined that the clutch speed difference is less than the clutch engagement determination value (YES in step S43), the start controller 300 determines whether the clutch is completely engaged while the gear is shifted to the first gear position (step S44). If the result of determination is NO in step S44, the start controller 300 carries out a control to have the clutch completely engaged (step S45). More specifically, since the clutch speed difference is not more than the prescribed value, which is an appropriate state for the clutch to be engaged, the clutch engagement control is carried out to complete the start control. If the result of determination in step S44 is YES, the start controller 300 sets the state status to the "first gear position clutch engaged state." In this manner, the start control is completed.

Figure 14:
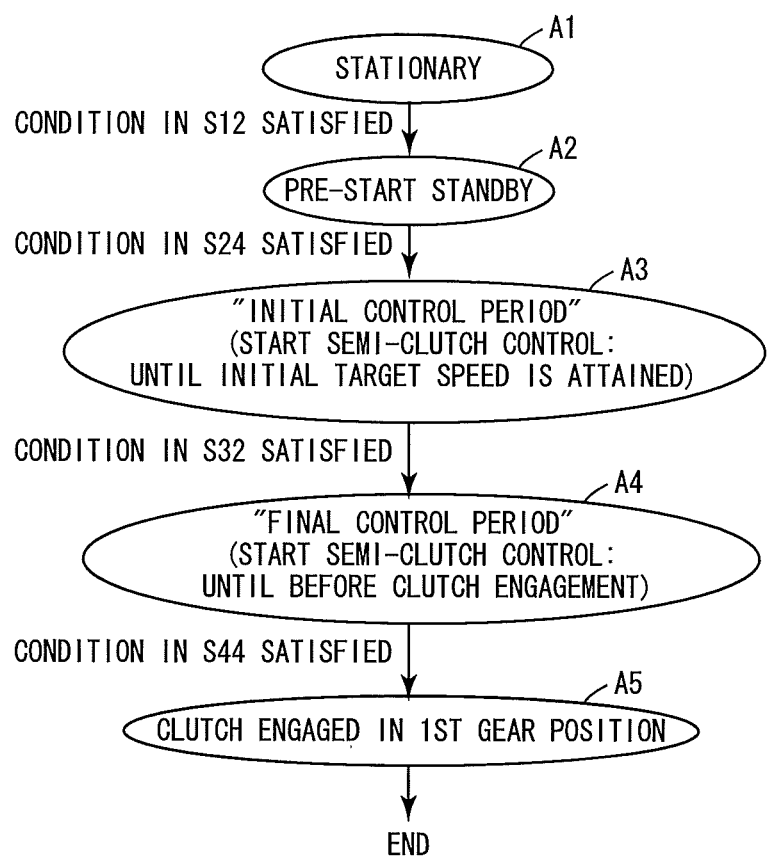
FIG. 14 is a state transition diagram showing the automatic start control.

FIG. 14 is a state transition diagram showing automatic start control. State A1 is a stationary state. If the condition in step S12 in FIG. 10 is satisfied, the control proceeds to state A2, i.e., a "pre-start standby state." If the condition in step S24 is satisfied in state A2, the control proceeds to state A3, i.e., the "initial control period." The "initial control period" is the T1-T2 period in FIG. 6, and the engine speed is controlled toward the initial target speed.

If the condition in step S32 is satisfied in state A3, the control proceeds to state A4, i.e., the "final control period." The "final control period" is the T2-T3 period in FIG. 6, and the engine speed is controlled toward the final target speed.

If the condition in step S44 is satisfied in state A4, state A5, i.e., a "first gear position clutch engaged state" is attained. In this manner, the start control is carried out through states A1 to A5.

The start control system according to the present preferred embodiment stores information that associates an accelerator position with an initial target speed of an engine and information that associates an accelerator position with a final target speed of the engine. If it is determined that the vehicle is in a start control period, the target speed of the engine is set to the initial target speed. When a value used to evaluate the engine speed reaches the initial target speed, the engine target speed is set to the final target speed. The initial target speed is set to a larger value than the final target speed for the same accelerator position.

In an initial state of starting, a rider can feel sufficient torque. It does not take too long before the clutch engages, and therefore starting as intended by the rider can be carried out.

According to the present preferred embodiment, when a difference between a pre-start engine speed and a value used to evaluate a present engine speed is a present difference and a difference between the pre-start engine speed and an initial target speed is an initial target difference, a ratio of the present difference to the initial target difference is calculated as a speed achieving ratio of the present difference to the initial target ratio. A ratio of engine torque to be distributed for inertia torque is determined in response to the speed achieving ratio. In the period until the initial target speed is attained, start control as intended by a rider can be carried out in response to the speed achieving ratio.

According to the present preferred embodiment, the torque distribution unit provides a higher distribution ratio for inertia torque as the speed achieving ratio becomes smaller. The driving torque is reduced in an early stage of starting and a smooth start with reduced shock can be achieved.

According to the present preferred embodiment, when an engine speed upon switching to the final target speed is a switching engine speed, a difference between the switching engine speed and a value used to evaluate a present engine speed is a present difference, and a difference between the switching engine speed and a final target speed is an initial difference, a ratio of the present difference to the initial difference is calculated as a speed achieving ratio. A speed change distribution until the final target speed is attained is determined in response to the speed achieving ratio. In the period until the final target speed is attained, start control as intended by a rider can be carried out in response to the speed achieving ratio.

According to the present preferred embodiment, the period after the initial target speed is attained until the final target speed is attained is divided into a first period starting immediately after the initial target speed is attained, a second period following the first period, and a third period following the second period. A speed change distribution is determined so that a speed change amount in the second period is larger than those in the first period having a minimum speed achieving ratio and the third period having a maximum speed achieving ratio among the three periods. When the initial target speed is attained or the clutch engages, the state can be changed smoothly.

Preferred embodiments of the present invention have been described with respect to the accompanying drawings, but the present invention is intended to be widely construed within the scope of the appended claims rather than being limited by the detailed description thereof except for the portions otherwise indicated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A start control system for controlling a start of a vehicle, the start control system comprising:
    a determining unit that determines a vehicle state;
    an input unit that inputs an accelerator position;
    a target speed setting unit that sets an engine target speed; and
    a storing unit that stores setting information; wherein
    the storing unit includes an association information storage that stores first association information that associates an accelerator position with a first target speed of an engine and second association information that associates the accelerator position with a second target speed of the engine;
    the target speed setting unit includes:
        a first setting unit that sets the engine target speed to the first target speed if it is determined by the determining unit that the vehicle is in a start control period; and
        a second setting unit that sets the engine target speed to the second target speed when a value used to evaluate an engine speed reaches the first target speed; wherein
    the first target speed is set to a larger value than the second target speed for the same accelerator position.

2. The start control system according to claim 1, wherein the first setting unit includes a torque distribution unit that calculates a ratio of a present difference to an initial difference as a speed achieving ratio and determines a distribution ratio of engine torque to be distributed for inertia torque in response to the speed achieving ratio;
    the present difference is a difference between a pre-start engine speed and a value used to evaluate a present engine speed; and
    the initial difference is a difference between the pre-start engine speed and the first target speed.

3. The start control system according to claim 2, wherein the torque distribution unit increases the distribution ratio for the inertia torque as the speed achieving ratio becomes smaller.

4. The start control system according to claim 2, wherein the first setting unit includes a target speed calculation unit that calculates an inertia torque target value based on the engine torque and the distribution ratio for inertia torque and an engine target speed based on the inertia torque target value.

5. The start control system according to claim 2, wherein the first setting unit includes a clutch controller that calculates a driving torque target value based on the engine torque and the distribution ratio for inertia torque and outputs clutch control information based on the driving torque target value.

6. The start control system according to claim 1, wherein the second setting unit includes a speed change distribution unit that calculates a ratio of a present difference to an initial difference as a speed achieving ratio and determines a speed change distribution until the second target speed is attained in response to the speed achieving ratio;
    a switching engine speed is an engine speed upon switching to the second target speed;
    the present difference is a difference between the switching engine speed and a value used to evaluate a present engine speed; and
    the initial difference is a difference between the switching engine speed and the second target speed.

7. The start control system according to claim 6, wherein when, a period of time after the first target speed is attained until the second target speed is attained is divided into a first period starting immediately after the first target speed is attained, a second period following the first period, and a third period following the second period, the speed change distribution unit determines the speed change distribution so that a speed change amount in the second period is larger than speed change amounts in the first period having a minimum speed achieving ratio and the third period having a maximum speed achieving ratio.

8. The start control system according to claim 6, wherein the second setting unit comprises a clutch controller that calculates an inertia torque target value based on a speed change amount determined by the speed change distribution unit and a driving torque target value based on engine torque and the inertia torque target value and outputs clutch control information based on the driving torque target value.

9. The start control system according to claim 5, wherein a clutch controlled based on the clutch control information is a wet-type multi-disk clutch.

10. The start control system according to claim 8, wherein a clutch controlled based on the clutch control information is a wet-type multi-disk clutch.

11. A vehicle comprising:
the start control system according to claim 1.

12. A motorcycle comprising:
the start control system according to claim 1.

* * * * *